United States Patent Office.

JOHN C. MARTIN, OF HAMMERSMITH, ENGLAND.

PAINT.

SPECIFICATION forming part of Letters Patent No. 468,402, dated February 9, 1892.

Application filed August 30, 1889. Serial No. 322,431. (No specimens.)

*To all whom it may concern:*

Be it known that I, JOHN COWDERY MARTIN, a subject of the Queen of Great Britain, residing at Hammersmith, county of Middlesex, England, have invented new and useful Improvements in Paints or Pigments, of which the following is a full, clear, and exact description.

This invention relates to improvements in the invention for which I obtained a patent in the United States November 11, 1890, No. 440,232; and it consists in adding to zinc oxide and sulphate of lime a small proportion of oxide of magnesium. I thoroughly mix the several ingredients, and then mix with oil and form into paint in the usual way.

The proportions of the several materials may vary; but I have obtained good results when the zinc oxide forms one to two thirds of the weight of the dry pigment, the oxide of magnesium about five to ten per cent., and the sulphate of lime the remainder.

What I claim is—

A paint or pigment consisting of oxide of magnesium, oxide of zinc, and sulphate of lime, substantially as set forth.

In testimony that I claim the foregoing as my invention I have signed my name in presence of two subscribing witnesses.

J. C. MARTIN.

Witnesses:
  W. A. SMITH,
73 *Sydner Road, Stoke Newington, London, N.*
  A. CARROLL,
79 *Cowper Road, South Hornsey, London, N.*